United States Patent [19]

Kazmark

[11] 4,401,319
[45] Aug. 30, 1983

[54] LUGGAGE CARRIER WITH PIVOTING HANDLE

[76] Inventor: Eugene A. Kazmark, 5 Remin La., Joliet, Ill. 60433

[21] Appl. No.: 280,942

[22] Filed: Jul. 6, 1981

[51] Int. Cl.³ ............................................. B62B 5/00
[52] U.S. Cl. ............................ 280/655; 280/47.37 R
[58] Field of Search ................ 16/111 R, 111 A, 112; 280/47.37 R, 641, 645, 652, 654, 655

[56] References Cited

U.S. PATENT DOCUMENTS

| | | | |
|---|---|---|---|
| 3,606,371 | 8/1969 | Rosseau et al. | 16/112 |
| 4,062,565 | 12/1977 | Holtz | 280/655 |
| 4,281,849 | 8/1981 | Chandick et al. | 280/655 |

FOREIGN PATENT DOCUMENTS

| | | | |
|---|---|---|---|
| 877508 | 9/1961 | United Kingdom | 280/655 |
| 1390020 | 4/1975 | United Kingdom | 280/655 |

*Primary Examiner*—David M. Mitchell
*Assistant Examiner*—Pierre Huggins

[57] ABSTRACT

A luggage carrier is provided with a pivoting handle which pivots between a use position and a storage position. The handle is pivotally attached to a pair of spaced-apart rods which extend upwardly from the base of the luggage carrier, and locking tubes which are slidably mounted on the handle are slidable over the upper ends of the rods to lock the handle in its use position.

1 Claim, 5 Drawing Figures

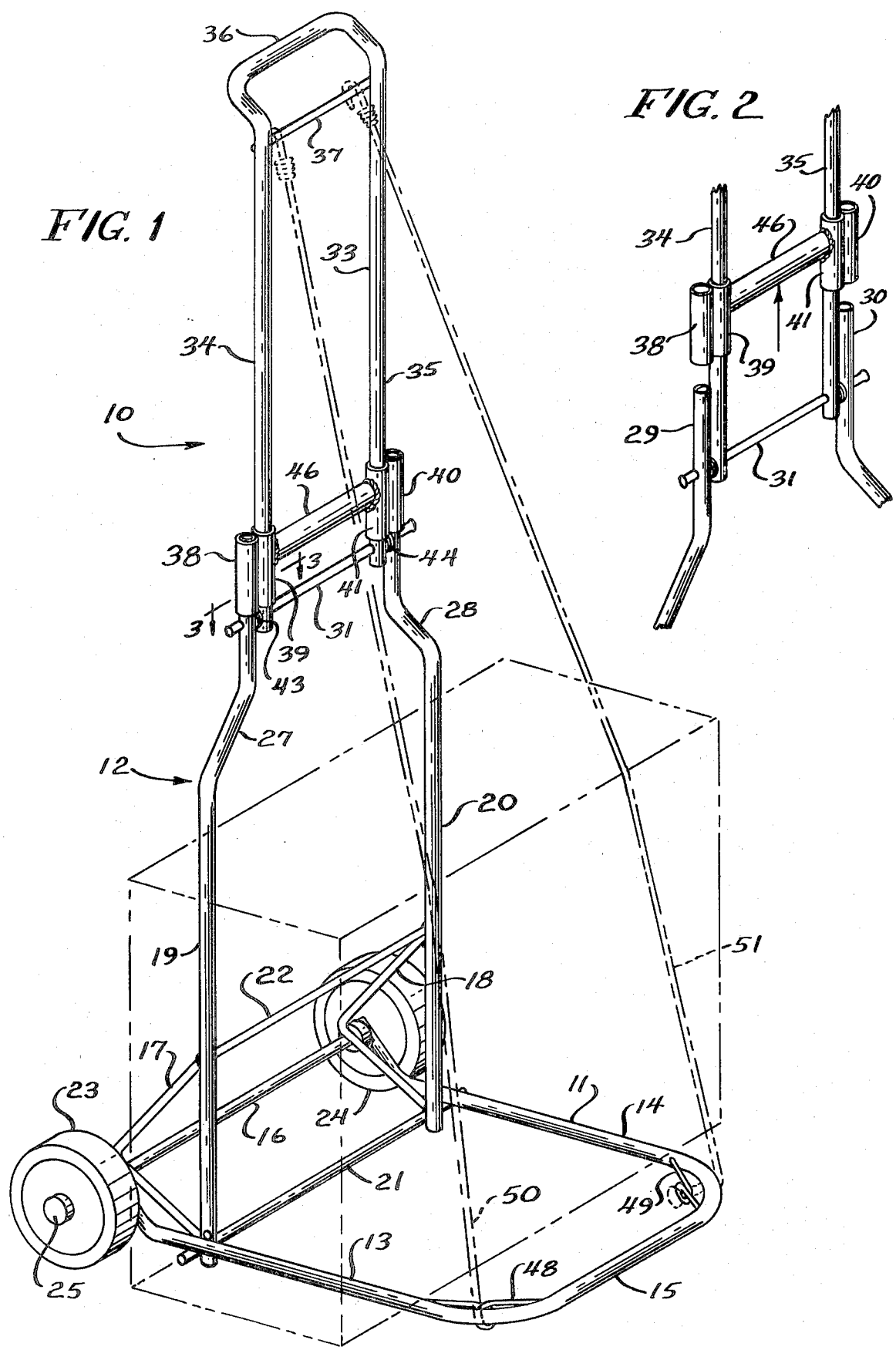

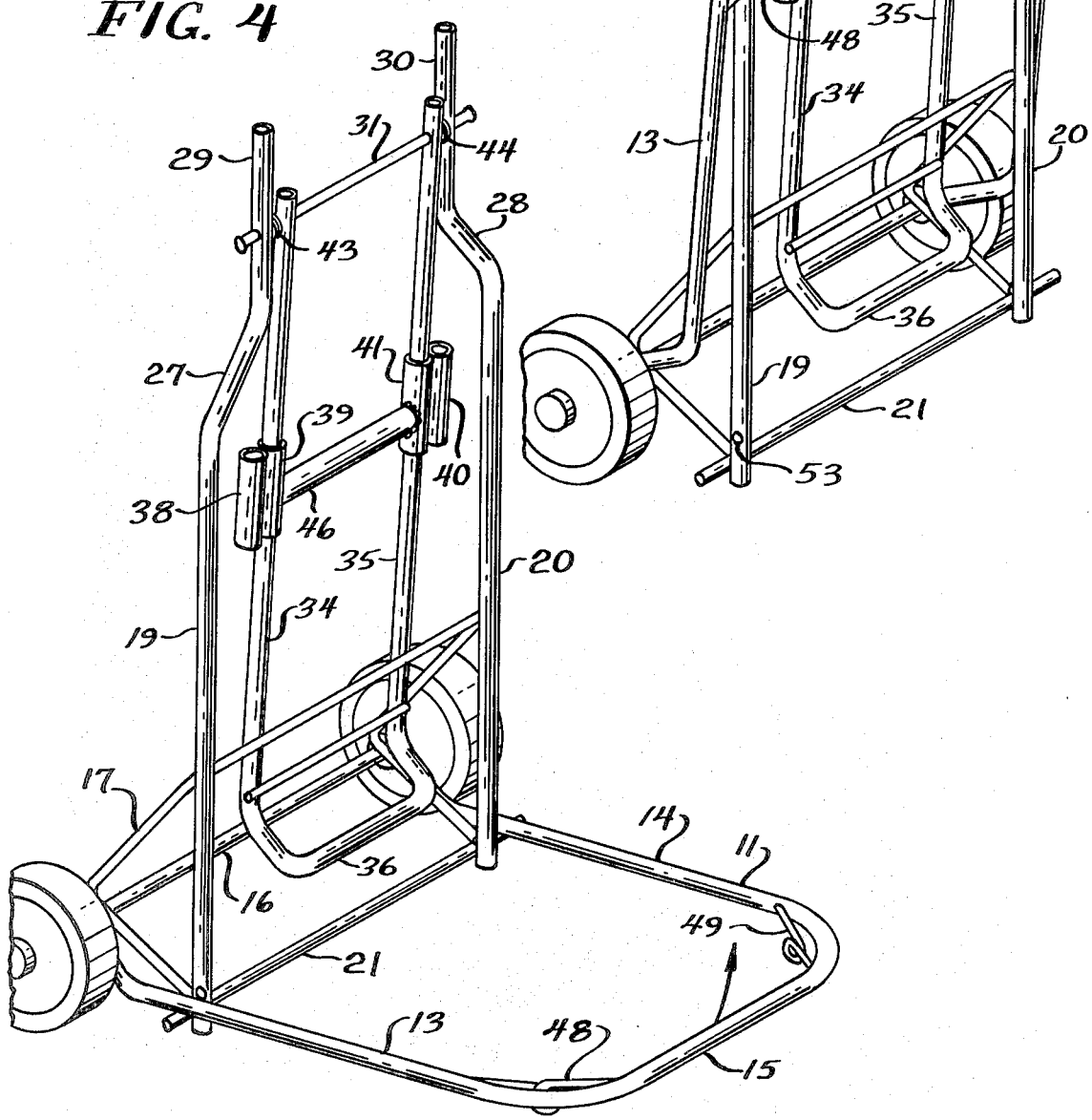

LUGGAGE CARRIER WITH PIVOTING HANDLE

BACKGROUND AND SUMMARY

This invention relates to a luggage carrier, and, more particularly, to a luggage carrier which is equipped with a pivoting handle to facilitate storage and carrying of the luggage carrier.

Several types of luggage carriers are shown in my prior U.S. Pat. Nos. 3,612,563, 3,998,476, and 4,175,769. Each of these luggage carriers includes a wheel-equipped base portion for supporting luggage, boxes, brief cases, etc., and a handle portion for pulling or pushing the base. The handle is telescoping or otherwise collapsible so that the luggage carrier can be stored or carried in a compact manner.

Telescoping handles require various parts to lock the telescoping portions of the handle, and these parts increase the cost of the luggage carrier because of the cost of the parts and the labor required to assemble the parts.

The invention provides an economical collapsible handle assembly which requires a minimum number of parts and which is rigid yet collapsible. The handle assembly includes a pair of spaced-apart rods which extend upwardly from the base of the luggage carrier, and the upper ends of the rods are reinforced by a pivot rod which extends between the rods. A U-shaped hand portion is pivotally attached to the pivot rod and is pivotable between a use position in which the hand portion extends upwardly from the pivot rod and a storage position in which the hand portion extends downwardly from the pivot rod. The hand portion can be releasably locked in the use position by two pairs of locking tubes which are slidably mounted on the hand portion. One locking tube of each pair is slidable over the upper end of one of the spaced-apart rods to lock the hand portion in its use position. A connecting rod extends between the two pairs of locking tubes to permit the locking tubes to be raised and lowered simultaneously and provides additional reinforcement.

DESCRIPTION OF THE DRAWING

The invention will be explained in conjunction with an illustrative embodiment shown in the accompanying drawing, in which:

FIG. 1 is a perspective view of a luggage carrier equipped with a folding handle in accordance with the invention;

FIG. 2 is a fragmentary perspective view showing the release of the locking tubes;

FIG. 3 is a sectional view taken along the line 3—3 of FIG. 1;

FIG. 4 shows the luggage carrier with the handle in the collapsed position; and

FIG. 5 shows the luggage carrier in the storage position.

DESCRIPTION OF SPECIFIC EMBODIMENTS

The numeral 10 designates generally a luggage carrier for carrying suitcases, brief cases, boxes, and the like. The term "luggage carrier" as used herein is not limited to a carrier for luggage or suitcases but is intended to refer broadly to a carrier for articles which have the general shape and weight of luggage.

The luggage carrier 10 includes a base portion 11 for supporting the luggage and a handle assembly 12 which extends upwardly from the base. The base is generally U-shaped and includes a pair of support rods 13 and 14 ends of the rods 13 and 14 curve upwardly and are pivotally mounted on an axle 16.

The axle 16 is welded to a pair of V-shaped rods 17 and 18, and the V-shaped rods are in turn welded to a pair of vertically extending rods 19 and 20. A cross rod 21 is welded to the lower ends of the vertical rods 19 and 20 to reinforce the bottom of the luggage carrier and to provide a stop against excessive rotational movement of the base rods 13 and 14. Another cross rod 22 is welded to the vertical rods 19 and 20 at the upper ends of the V-shaped rods 17 and 18. Wheels 23 and 24 are rotatably mounted on the axle 16 and retained thereon by end caps 25.

The vertically extending rods 19 and 20 extend laterally inwardly at 27 and 28 and terminate in upwardly extending parallel end portions 29 and 30 (FIGS. 4 and 5). A pivot rod 31 extends between the end portions 29 and 30.

A generally U-shaped hand portion 33 is pivotally connected to the pivot rod 31 and includes a pair of parallel rods 34 and 35 and a connecting rod 36. A cross rod 37 extends between the parallel rods 34 and 35 adjacent the connecting rod to provide additional reinforcement. The pivot rod 31 extends through openings in the ends of the rods 34 and 35. The hand portion is pivotable between a use position illustrated in FIG. 1 in which it extends upwardly from the pivot rod 31 and parallel to the end portions 29 and 30 and a storage position in which it extends downwardly from the pivot rod as shown in FIGS. 4 and 5.

A pair of locking tubes or sleeves 38 and 39 cooperate to lock the rod 34 of the hand portion and the upper end 29 of the vertical rod 19, and a pair of locking tubes or sleeves 40 and 41 cooperate to lock the rod 35 of the hand portion and the upper end 30 of the vertical rod 20. The two locking tubes of each pair of locking tubes are joined together, as by welding, brazing, or the like, and the inner locking tubes 39 and 41 are slidable on the rods 34 and 35. The rods 34 and 35 are spaced laterally inwardly from the upper end portions 29 and 30 of the vertical rods by spacers or washers 43 and 44 (FIG. 4) so that the center-to-center distance of each pair of locking tubes corresponds to the center-to-center distance between the associated rods. Accordingly, the outer locking tubes 38 and 40 can slide up and down over the upper end portions 29 and 30 of the vertical rods when the rods 34 and 35 of the hand portion are aligned parallel with the rod end portions 29 and 30 as shown in FIG. 2. A connecting rod 46 extends between the inner locking tubes 39 and 41 to permit the two pairs of locking tubes to be raised and lowered simultaneously.

In FIG. 1 the locking tubes effectively lock the hand portion to the vertical rods 19 and 20 to prevent the hand portion from pivoting. The luggage carrier can be pulled or pushed on its wheels by grasping the connecting portion 36 of the hand portion and tilting the hand assembly toward the user. The pivot rod 31 and the connecting rod 46 connect the two sides of the handle assembly together and reinforce the hand handle assembly against torsional movement.

The luggage or other articles which are to be transported are supported by both the handle assembly 12 and the base 11 when the handle assembly is incline from the vertical. A pair of eyelets 48 and 49 are attached to the front corners of the base, and cables illustrated in phantom at 50 and 51 in FIG. 1 can be attached to the eyelets 48 and 49 and to the cross rod 37 at the upper end of the hand portion to hold the luggage indicated in phantom in FIG. 1 against the handle assembly.

When the luggage carrier is to be stored or carried by itself, the handle assembly can be folded simply by lifting the connecting rod 46 to raise the outer locking tube 38 and 40 above the ends of the rod end portions 29 and 30 as shown in FIG. 2. The hand portion 33 is then free to pivot downwardly to its storage position illustrated in FIGS. 4 and 5. The laterally inwardly extending portions 27 and 28 of the vertical rods 19 and 20 provide sufficient space between the lower portions of the vertical rods to permit the locking tubes to swing between the rods. These inwardly extending portions also provide additional reinforcement against torsional movement of the handle.

The support rods 13 and 14 of the base portion 11 are pivotally attached to the axle 16, and the base portion can be pivoted upwardly until the connecting rod 15 of the base portion engages the vertical rods 19 and 20 as shown in FIG. 5. The luggage carrier is now completely collapsed into a compact configuration for storage or carrying. However, the luggage carrier can be supported in a generally vertical position as illustrated in FIG. 5 even when it is collapsed. The bottoms of the vertical rods 19 and 20 and the two wheels provide a 4 point support for the collapsed luggage carrier.

Detents 53 (see particularly FIG. 5) are provided on the lower ends of the vertical tubes 19 and 20 above the cross rod 21. The detents engage the support rods 13 and 14 of the base portion and releasably lock the base portion in the use position illustrated in FIG. 1.

Although I have described the upper and lower portions of the handle assembly as being formed from rods, the term "rods" as used herein is not meant to be limited to a solid cylindrical member. For example, the rods could be hollow tubes with round or rectangular cross sections.

While in the foregoing specification a detailed description of a specific embodiment of the invention has been set forth for the purpose of illustration, it will be understood that many of the details herein given my be varied considerably by those skilled in the art without departing from the spirit and scope of the invention.

I claim:

1. A luggage carrier comprising a base portion, and a handle assembly extending upwardly from the base portion, the handle assembly including a pair of spaced-apart rods attached to the base portion and extending upwardly therefrom, each of said spaced-apart rods including a laterally inwardly extending intermediate portion so that the upper ends of the spaced-apart rods are closer together than the lower ends of the spaced-apart rods, a pivot rod extending between said pair of rods adjacent the upper ends thereof and above said laterally inwardly extending intermediate portions, a generally U-shaped hand portion pivotally attached to said pivot rod, the U-shaped hand portion including a pair of side portions which extend generally parallel to and inwardly of said spaced-apart rods and which are pivotally attached to said pivot rod and a connecting portion which extends generally perpendicularly between said side portions, the hand portion being pivotable between a use position in which the side portions extend upwardly from the pivot rod and generally parallel to said pair of rods and a storage position in which the side portions extend downwardly from the pivot rod generally parallel to and inwardly of said spaced-apart rods, a first locking tube slidably mounted on each of the side portions of the U-shaped hand portion, a second locking tube secured to each of the first locking tubes, a connecting rod extending between both of said first locking tubes whereby all of the locking tubes can be raised and lowered simultaneously by moving said connecting rod, each of the second locking tubes being slidable over the upper end of one of said of pair of rods when the hand portion is in the use position whereby the hand portion is locked against pivotal movement with respect to said pair of rods, the intermediate portions of the spaced-apart rods spacing the lower ends of the spaced-apart rods a sufficient distance apart so that the locking tubes can be positioned between the spaced-apart rods when the hand portion is in the storage position.

* * * * *